United States Patent [19]
Rackin

[11] 3,933,526
[45] Jan. 20, 1976

[54] HOUSING FOR BATTERY CELL WITH PROTECTION FOR PRESSURE AND TEMPERATURE

[75] Inventor: Mark H. Rackin, Sunrise, Fla.

[73] Assignee: Motorola, Inc., Chicago, Ill.

[22] Filed: Sept. 9, 1974

[21] Appl. No.: 504,210

[52] U.S. Cl................................ 136/166; 136/181
[51] Int. Cl.².......................................... H01M 6/50
[58] Field of Search ............ 136/179, 181, 182, 178, 136/166

[56] References Cited
UNITED STATES PATENTS

| | | | |
|---|---|---|---|
| 2,269,040 | 1/1942 | Rublee | 136/179 |
| 2,289,128 | 7/1942 | Kopf | 136/182 |
| 2,651,669 | 9/1953 | Neumann | 136/179 |
| 3,373,057 | 3/1968 | Jost et al. | 136/179 |
| 3,617,386 | 11/1971 | Bosben et al. | 136/178 |
| 3,622,397 | 11/1971 | Belove | 136/181 |

Primary Examiner—Donald L. Walton
Attorney, Agent, or Firm—Donald B. Southard; James W. Gillman

[57] ABSTRACT

A housing for a battery cell includes a built-in switch for opening the circuit to the battery in response to excess pressure and/or temperature. The housing has a first conducting contact connected to the first battery electrode, and a second contact connected to the second electrode and connected through a wall of the housing to provide a circuit to the battery cell. The second contact may be a porous wall to allow gasses which form in the battery cell to pass to the outer housing wall, and when the pressure exceeds a predetermined value the outer wall will flex and open the electrical connection to the battery. The outer wall can be a bimetallic disc which flexes with rise in temperature of the battery cell to open the connection when the temperature exceeds a predetermined value. The pressure responsive action can be provided alone, the temperature responsive action can be provided alone, or the two features can be used in combination to provide a housing wherein the connection to the battery is opened in response to excessive pressure or temperature, or a combination of the two conditions.

6 Claims, 5 Drawing Figures

HOUSING FOR BATTERY CELL WITH PROTECTION FOR PRESSURE AND TEMPERATURE

BACKGROUND OF THE INVENTION

With the increasing use of small portable electronic devices, the need for small rechargeable battery cells has greatly increased. Single use cells involve a substantial cost to provide the electrical energy for portable units, so that rechargeable cells are used in greatly increasing quantities. There is a problem, however, in the use of such batteries by unskilled persons, in that there is the possibility that the battery can explode while being charged due to excessive pressures which may develop within the battery cell. Similarly, excessive temperatures may be encountered which can damage the battery if some protection is not available.

In connection with rapid charging systems, highly complex arrangements have been used to provide protection for the battery. These systems are quite expensive, have not been very reliable, and are not compatible with conventional cells.

It has been proposed to provide pressure and temperature responsive switches which can be used either inside the battery housing or externally thereof, to disconnect the battery, or to operate some control device to prevent damage to the battery. However, existing structure have required a discrete switch device which involves substantial space in the battery and also involves a cost which substantially increases the cost of the battery. Inasmuch as many portable devices now being produced are quite inexpensive, the provision of a pressure and/or temperature responsive switch in the battery adds a cost item which is quite substantial as compared to the overall cost of the equipment. This may render the device economically unattractive.

SUMMARY OF THE INVENTION

It is an object of the present invention to provide a housing for a battery cell wherein the housing has a part which responds to a dangerous condition of the battery to open the circuit to the battery.

A further object of the invention is to provide a housing for a battery cell having an inner conducting wall which is porous and an outer conducting wall which is normally in electrical contact with the inner wall to provide a circuit to the cell, and which responds to the pressure of gasses developed in the battery cell to move away from the inner wall and open the circuit.

Another object of the invention is to provide a housing for a battery cell having a pair of conducting walls which are in contact with each other, and wherein one wall is responsive to temperature and moves away from the other wall to open the circuit in response to a rise in temperature in the battery cell.

A still further object of the invention is to provide a housing for a battery cell of the rechargeable type wherein the housing has a conducting portion which flexes in response to increase in pressure within the cell and/or to increase in temperature within the cell, and wherein the housing portion is normally in engagement with an electrical contact connected to the battery cell and which opens the circuit to the battery cell when such portion flexes.

In accordance with the invention, a housing is provided for a rechargeable battery cell which has first and second electrodes, which housing includes a tubular member having first and second ends with a closure for the first end having a conducting contact thereon which is connected to the first electrode of the battery. The second end of the tubular member has a conducting closure which normally engages a contact connected to the second electrode of the battery so that connections to the battery cell are made through the first and second conducting closures of the housing. The second closure is constructed to flex with increasing pressure within the battery to move out of engagement with the contact and open the circuit to the battery cell. This responds to increased pressure caused by the gasses developed in the cell to open the circuit during charging, so that pressure does not build up which might cause the battery to explode. The second closure may also be constructed to respond to a change in temperature so that when a predetermined rise in temperature takes place in the battery cell, the closure will flex to open the circuit to prevent further current therethrough and possible damage to the battery cell. The contact connected to the second electrode of the battery can be an inner porous conducting wall which allows gases to pass therethrough to the closure which flexes in response to the pressure. The closure which responds to temperature may be a bimetallic disc which snaps between a normal position and a bowed position to open the circuit. The bimetallic disc can be used with an inner porous wall to respond to both pressure and temperature.

DETAILED DESCRIPTION

Figure 1:
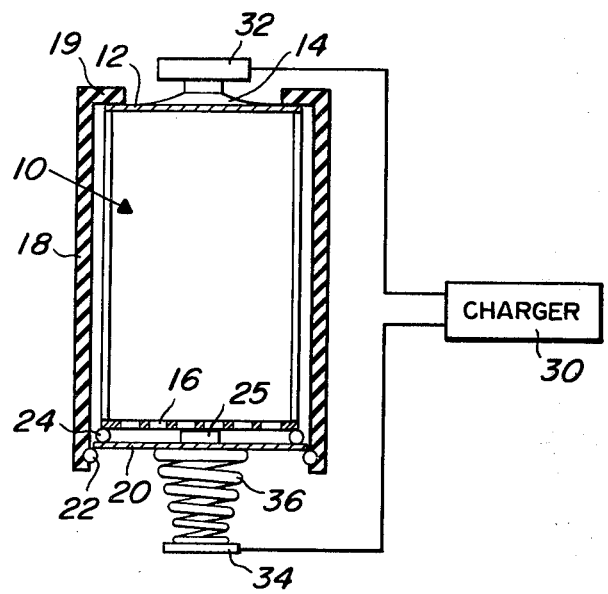
FIG. 1 is a cross-sectional view of a battery in accordance with the invention, showing the connection of a battery charger thereto.

In FIG. 1 there is illustrated a rechargeable battery cell 10 which is of cylindrical or other suitable configuration, having an end 12 with a conducting contact 14 thereon which is connected to one electrode of the cell, such as the anode thereof. The cell has a conducting wall 16 at the opposite end which is connected to the second electrode of the cell, which may be the cathode. The cell is enclosed in an insulating housing 18 having an inturned edge 19 for retaining the cell proper 10 therein. An outer conducting disc 20 is secured to the end of the housing 19 by a pressure ring 22, with a second pressure ring 24 being positioned between the disc 10 and the bottom edge of the wall 16. A conducting contact 25 is secured to the disc 20 and engages the conducting wall 16 when the disc 20 is in its normal position to complete the circuit to the second electrode of the cell.

For charging the cell 10, a charger 30 is provided which may be of known construction. The charger 30 has output conductors connected to terminals 32 and 34. Terminal 32 engages the contact 14 connected to the battery cell, and the terminal 34 is connected through a spring contact 36 to the conducting disc 20. The spring contact 36 insures pressure connections to the terminals 14 and 20. Accordingly, current provided by the charger flows through the terminals 32 and 34 to the contacts 14 and 20 which are connected to the battery cell. During charging of the battery cell gasses are developed in the cell, and this may result in the build-up of pressure within the cell. The wall 16 is porous so that the pressure is applied to the disc 20. When a certain pressure is reached, the disc 20 will bow, since it is constructed of material which will flex. This will cause the contact 25 on the disc 20 to move out of engagement with the conducting wall 16 to thereby open the circuit from the charger 30 to the battery cell 10.

Figure 2:
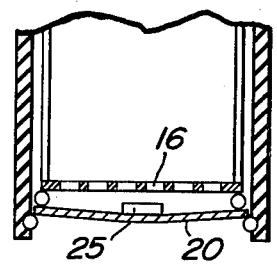
FIG. 2 is a cross-sectional view of a portion of the battery of FIG. 1 showing the operation thereof in response to excess pressure.

FIG. 2 shows the bottom of the battery of FIG. 1 under the condition that gasses have been produced within the cell causing pressure against the disc 20 to cause the same to flex so that the contact 25 thereon moves out of engagement with the wall 16. The pressure seals 22 and 24 are made of insulating material so that the conducting wall 16 and disc 20 are in electrical contact only through the conducting contact 25. Accordingly, when the disc 20 flexes and the contact 25 moves away from the wall 16, the circuit from the charger 30 to the battery cell 10 will open, and the charging will cease. This will tend to stop the rise in pressure within the cell which might rupture the housing for the cell and cause a dangerous explosion.

Although the action of the disc 20 of the structure of FIG. 1 has been described in response to increased pressure during charging, the disc 20 would, of course, operate in response to pressure build up under any other condition. In the event that a build up in pressure is produced by heavy current drawn from the battery, or for any other reason, the circuit to the cell will be broken to terminate the flow of current.

Figure 3:
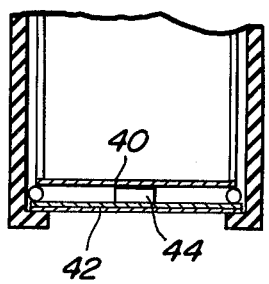
FIG. 3 shows an embodiment of the battery housing of FIG. 1 including a bimetallic disc responsive to temperature.
Figure 4:
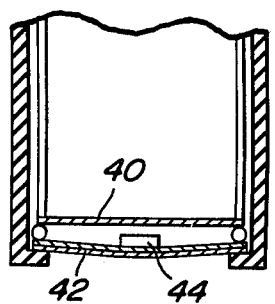
FIG. 4 shows the structure of FIG. 3 with the disc being bowed in response to the rise in temperature.

FIG. 3 illustrates a battery in accordance with the invention wherein the conducting wall 40 at the bottom of the housing is not porous. In this structure the closure disc 42 is made of bimetallic material and responds to an increase in temperature in the battery cell so that the disc 42 bows, and the contact 44 thereon moves away from the conducting wall 40. This action is illustrated by FIG. 4. It will be apparent that this action also breaks the connection to the battery cell to prevent charging, if an excessive rise in temperature results from charging of the battery. This structure would also open the circuit to the cell in the event that heavy current is drawn therefrom which could cause an excessive rise in temperature.

Figure 5:
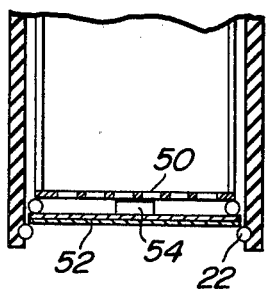
FIG. 5 shows an embodiment of the housing of FIG. 1 which is responsive to both pressure and temperature.

It will be apparent that a bimetallic disc, such as the disc 42 in FIG. 4, can also be used in the structure of FIG. 1 instead of the disc 20 which responds only to pressure. Such a construction is shown in FIG. 5 wherein the conducting inner wall 50 of the battery is made of porous material, and may be of the same construction as the wall 16 in FIG. 1. The conducting disc 52 is formed of bimetallic material and may be of the same construction as the disc 42 in FIG. 4. A contact 54 is secured to the disc 52 and is normally in engagement with the conducting closure 50 to complete the circuit from the contacts of the battery housing to the electrodes of the battery cell. The structure in FIG. 5 will respond to an increase in pressure resulting from gasses developed in the cell, and also to an increase in temperature developed within the cell, causing the disc 52 to flex. Accordingly, the structure of FIG. 5 will respond to either a rise in pressure within the cell or a rise in temperature within the cell. The structure of FIG. 5 will also respond to the combination of pressure and temperature, both of which will tend to cause the disc 52 to flex. That is, pressure of gasses flowing through porous closure 50 will cause the disc 52 to tend to flex, and also the bimetallic disc will tend to flex in response to a rise in temperature.

The structure of the invention provides protection for battery cells which may be of conventional construction. That is, the outer housing can be used with a cell which is of known, simple form. The housing can be inexpensively constructed and provides protection which prevents damage to the cell, or to the equipment with which it is used, when excessive pressures, and/or temperatures, are developed therein.

I claim:

1. A housing for a rechargeable battery cell having first and second electrodes, including in combination:
    a tubular member having first and second ends;
    a closure for said first end having a first conducting contact thereon connected to a first electrode of the battery;
    a conducting inner closure for said second end connected to the second electrode of the battery; and
    a conducting outer closure for said second end having a second conducting contact thereon, said outer closure being movable from a first normal position in which said outer closure makes electrical connection with said inner closure to a second position in which said outer closure is spaced from said inner closure, said outer closure being responsive to a rise in temperature in the battery cell to move to said second position to open the circuit from said first and second conducting contacts to the electrodes of the battery.

2. A housing for a battery cell in accordance with claim 1 wherein said inner closure is porous and said outer closure responds to the pressure of the gasses developed in the battery cell as well as to the temperature thereof.

3. A housing for a battery cell in accordance with claim 1 wherein said outer closure is a bimetallic disc which snaps between said first and second positions in response to changes in temperature within the battery cell.

4. A housing for a battery cell in accordance with claim 3 wherein said inner closure is a porous shell through which gasses developed by the battery cell pass, and said outer closure responds to the pressure of the gasses developed in the cell as well as to the temperature thereof.

5. A housing for a battery cell having first and second electrodes including in combination,
    a conducting terminal on said housing connected to the first electrode of the battery cell,
    a conducting housing wall formed of bimetallic material which flexes in response to a rise in temperature, and
    conductor means connected to the second electrode of the battery cell and engaging said housing wall for completing a circuit from said wall to the battery cell,
    said housing wall flexing when the temperature of the battery cell exceeds a predetermined value to move out of engagement with said conductor means and open the circuit therefrom to the battery cell.

6. The housing of claim 5 wherein said conductor means is a porous inner wall of the housing through which gasses developed in the battery cell pass to apply pressure to said conducting housing wall to cause the same to flex and move out of engagement with said conductor means and thereby open the circuit from said housing wall to the battery cell.

* * * * *